United States Patent [19]
Schilling

[11] Patent Number: 5,299,914
[45] Date of Patent: Apr. 5, 1994

[54] STAGGERED FAN BLADE ASSEMBLY FOR A TURBOFAN ENGINE

[75] Inventor: Jan C. Schilling, Middletown, Ohio

[73] Assignee: General Electric Company, Cincinnati, Ohio

[21] Appl. No.: 757,854

[22] Filed: Sep. 11, 1991

[51] Int. Cl.⁵ ............................................. F01D 5/14
[52] U.S. Cl. ............................. 416/203; 416/223 A
[58] Field of Search ............... 416/175, 198 A, 200 A, 416/203, 223 A

[56] References Cited

U.S. PATENT DOCUMENTS

| | | | |
|---|---|---|---|
| 2,222,444 | 11/1940 | Schmidt et al. | 416/203 |
| 2,839,239 | 6/1958 | Stalker | 416/198 A |
| 3,347,520 | 10/1967 | Owczarek | |
| 3,536,417 | 10/1970 | Stiefel et al. | |
| 3,703,211 | 11/1972 | Bernaerts | 416/175 |
| 4,720,239 | 1/1988 | Owczarek | 416/223 A |

FOREIGN PATENT DOCUMENTS

| | | | |
|---|---|---|---|
| 221559 | 5/1910 | Fed. Rep. of Germany | |
| 1019200 | 8/1956 | Fed. Rep. of Germany | |
| 1012041 | 7/1952 | France | |
| 150903 | 8/1984 | Japan | 416/203 |
| 0785528 | 12/1980 | U.S.S.R. | |
| 324889 | 5/1984 | U.S.S.R. | 416/175 R |
| 630747 | 10/1949 | United Kingdom | 416/203 |

*Primary Examiner*—Edward K. Look
*Assistant Examiner*—James A. Larson
*Attorney, Agent, or Firm*—Jerome C. Squillaro; John R. Rafter

[57] ABSTRACT

A turbofan gas turbine engine fan stage having alternating relatively rugged, preferably hollow titanium, blades and staggered relatively less rugged, preferably composite, blades. The blades are staggered such that the leading edges of the rugged titanium blades are positioned forward of the leading edges of the less rugged composite blades. One embodiment provides that all fan blades have trailing edges at the same axial position while another embodiment provides that all fan blades are of the same size and shape.

7 Claims, 2 Drawing Sheets

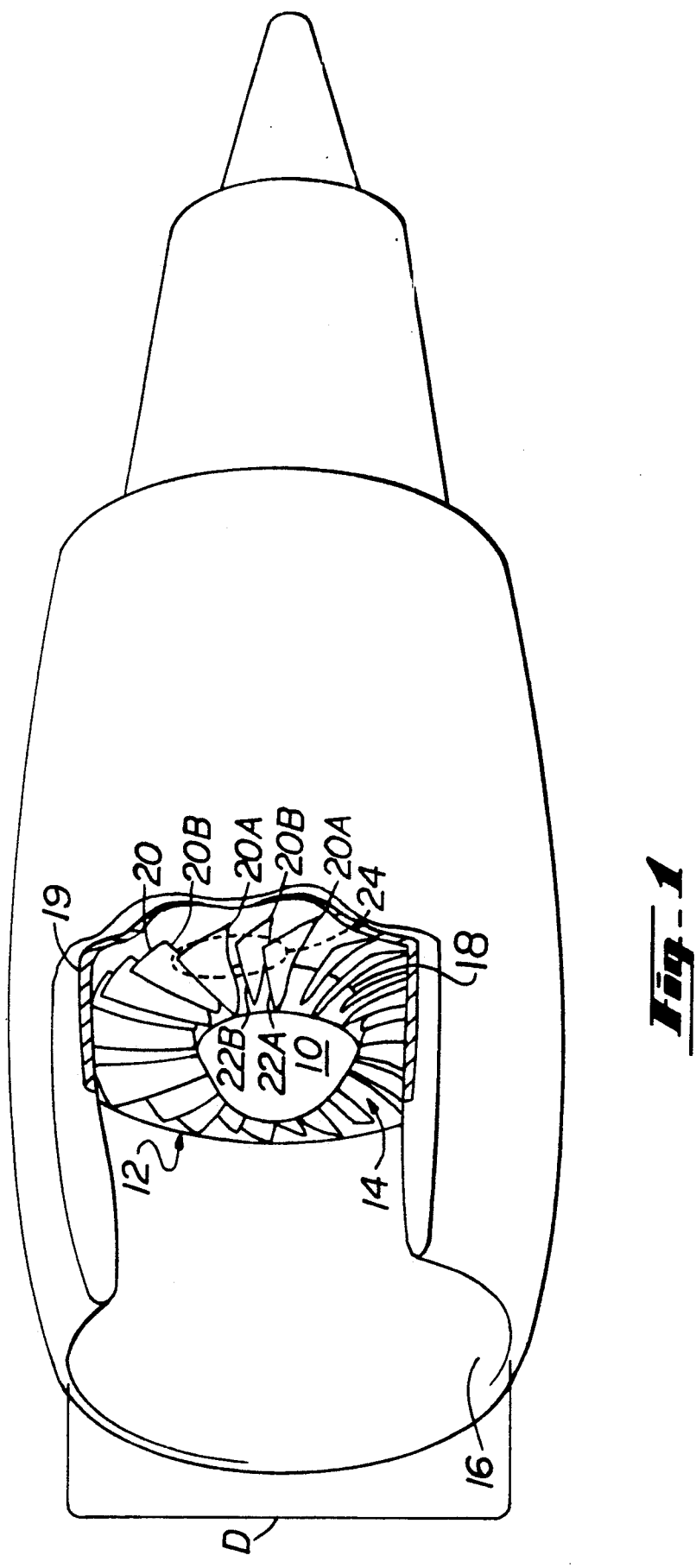

5,299,914

STAGGERED FAN BLADE ASSEMBLY FOR A TURBOFAN ENGINE

BACKGROUND OF THE INVENTION

1. Field of the Invention

The invention relates to turbofan gas turbine engine fans and in particular to fan sections having rows of staggered rugged (highly resistant to foreign object damage) blades and relatively less rugged lighter weight blades.

2. Description of Related Art

Large turbofan engines are particularly subject to foreign object damage, commonly referred to as FOD, caused by objects such as ice, hail, birds and runway debris. Fan blades are conventionally strengthened to avoid severe debilitating damage to the fan blades. This strengthening substantially increases the weight of the fan blades, disc, and supporting structure. The increased engine weight in turn increases the weight of the aircraft and requires more fuel to be burned.

Wide chord fan blades enhance the fan's performance and the engine's efficiency but pose additional problems in terms of blade weight while increasing the blade FOD resistance or ruggedness. Composite fan blades have been developed for use in slower speed high bypass ratio turbofan engines, having a bypass ratio of between 8 and 15, because of their weight advantage. However composite blades are relatively weak as compared to metal blades and have proven marginal in meeting impact requirements to demonstrate FOD resistance. Due to the strength and impact limitations of composites, composite fan bladed engine growth is limited. Composite fan blades are currently limited to engines having tip speeds below 1300 ft/sec and require leading edge guards on the fan blades for erosion protection. The present invention is particularly useful for wide chord turbofan fan blades.

Hollow titanium blades have been developed for use in turbofan engines of higher tip speeds (>1300 ft/sec). Wide chord titanium blades are lightened by making them hollow but because of the aspects ratio and blade number, they are still not weight competitive with fan blades having a high aspect ratio and a conventional number of blades.

Hybrid blades (part composite and part titanium) have been proposed but they are still limited in terms of impact for the high speed application and are difficult and expensive to manufacture.

SUMMARY OF THE INVENTION

The present invention provides a fan stage having alternating rugged, preferably hollow titanium, blades and staggered relatively less rugged, preferably composite, lighter weight blades. The blades are staggered such that the leading edges of the titanium blades are positioned forward of the leading edges of the composite blades. One embodiment provides that all fan blades have trailing edges at the same axial position while another embodiment provides that all fan blades are of the same size (chord and thickness).

The terms rugged and less rugged are relative terms as indicated and used herein to generally describe the attributes and characteristics of a blades ability to resist foreign object damage commonly referred to as FOD. It is further understood that rugged blades are heavier than less rugged blades.

The present invention combines the best features of rugged heavier fan blades and light weight relatively less rugged fan blades. The use of rugged hollow titanium blades to shade less rugged composite blades from FOD, particularly bird strikes, provides a light weight fan blade assembly able to withstand FOD damage. The weight and FOD resistant advantages of the present invention become more important to the overall design and viability of the turbofan engine as the diameter of the fan increases. The present invention also provides a fuel efficiency advantage because it helps allow construction of relatively larger diameter fans that have higher bypass ratios which are inherently more efficient than smaller diameter fans having lower bypass ratios.

BRIEF DESCRIPTION OF THE DRAWING

The foregoing aspects and other features of the invention are explained in the following description, taken in connection with the accompanying drawing where:

FIG. 1 is a cutaway perspective view of an aircraft turbofan gas turbine engine having a fan stage assembly in accordance with the present invention.

DETAILED DESCRIPTION OF THE INVENTION

Figure 3:
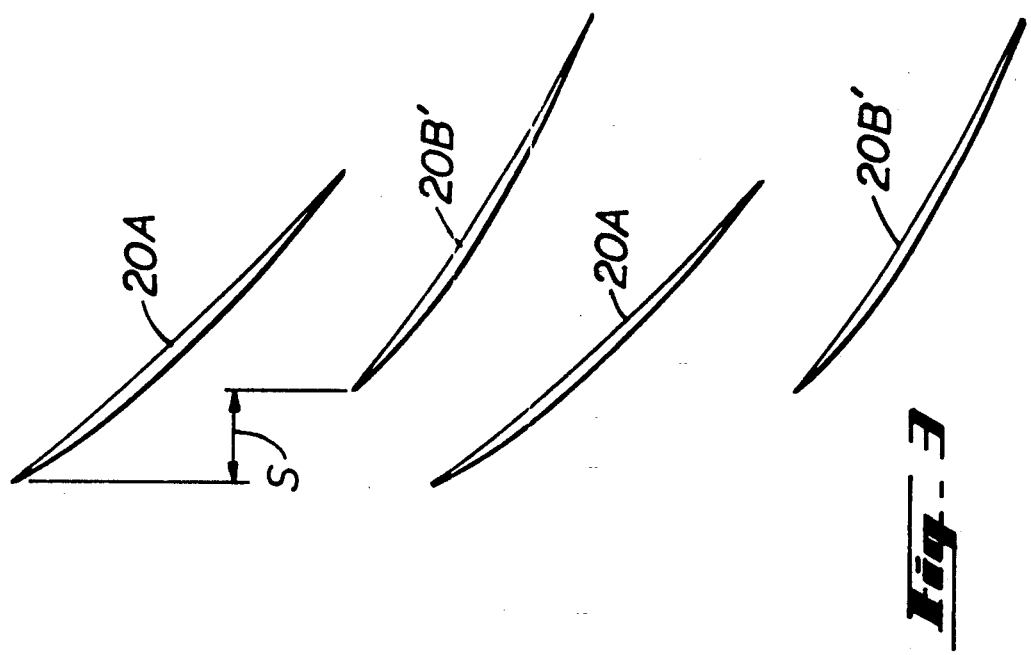
FIG. 3 is a top planform diagrammatic view of a fan stage assembly having a fan blade arrangement in accordance with an alternative embodiment of the present invention.

The present invention, illustrated in FIG. 1, is a fan blade assembly generally shown at 10 for a turbofan gas turbine engine 12 having a fan section 14 disposed in an annular nacelle 16. An annular fan casing 19 circumscribes fan assembly 10. Fan section 14 includes a fan rotor 18 upon which are mounted fan blades 20 of a single stage fan blade assembly 10 such that fan blades 20 are in rotating sealing relationship with fan casing 19.

Fan blades 20 are of two types, the first being rugged fan blades 20a that are preferably hollow titanium blades. The second type of fan blades are lighter weight less rugged fan blades 20b that are preferably composite blades. Less rugged fan blades 20b are staggered with respect to rugged fan blades 20a so that they are mounted on fan rotor 18 axially aft of the rugged fan blades. Less rugged fan blades 20b include radially extending less rugged fan blade leading edges 22b that are axially set back from corresponding rugged fan blade leading edges 22a so that less rugged blades 20b lie in a protected shadow Z (shown in FIG. 2) of rugged blades 20a during encounters with foreign objects as gauged by bird strikes. Bird strike tests are common tests used by manufacturers and the United States government to test and certify the strength and integrity of fan assemblies and turbofan engines and their ability to resist FOD.

Figure 2:
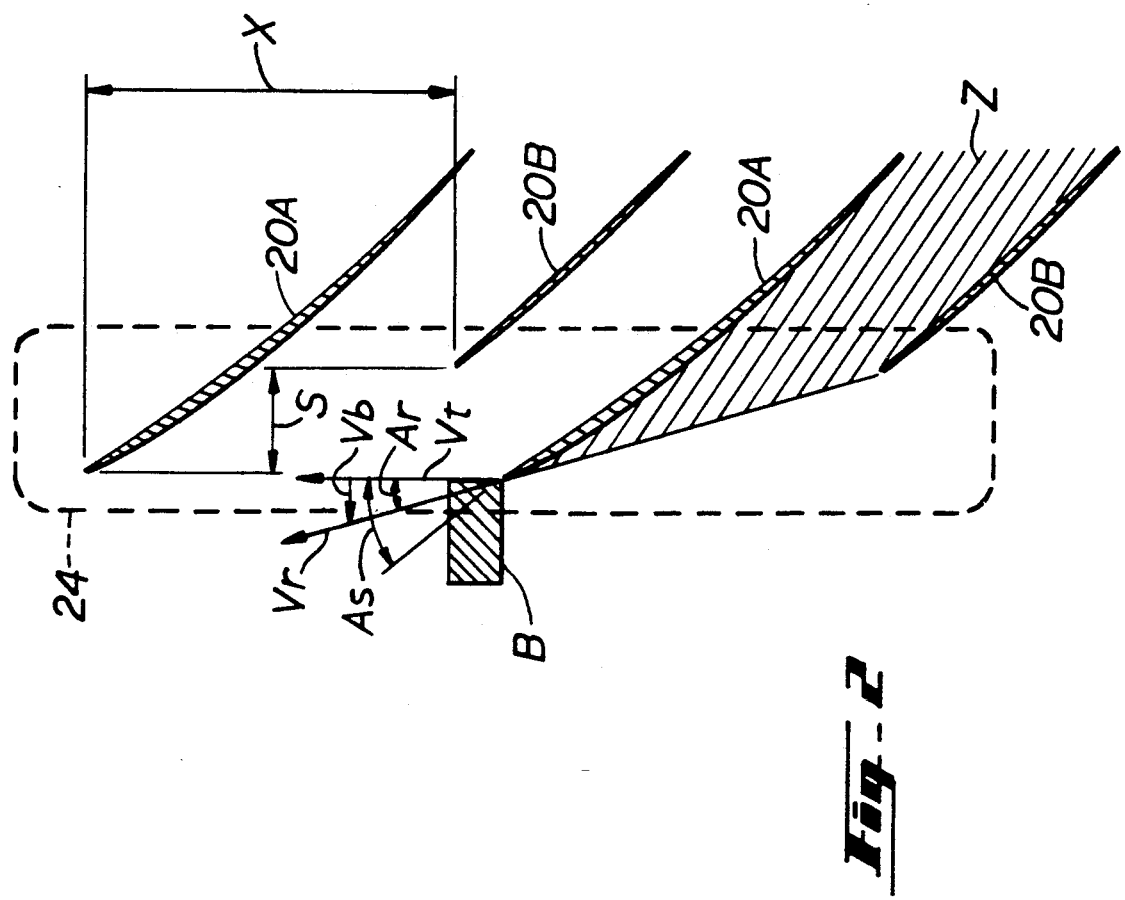
FIG. 2 is a top planform diagrammatic view of the fan stage assembly in FIG. 1 in accordance with the preferred embodiment of the present invention.

Presently between 22 and 26 fan blades are preferable for today's wide chord fan blade assemblies for high bypass ratio turbofan engines. Referring now to FIG. 2, the preferred embodiment of the present invention provides a 50/50 mix of hollow titanium blades and composite blades though other mixes are contemplated. The titanium blades are positioned forward of the composite blade at a tip region 24, in the area denoted between the dashed lines in FIG. 2. An axial setback S, the axial positioning difference between rugged fan blades 20a and less rugged fan blades 20b is preferably a function of rotor speed, fan diameter, and threshold damage to less rugged blade 20b.

The preferred embodiment applies setback S to a known configuration for a given fan design where the number of fan blades 20, fan diameter D (FIG. 1), circumferential blade spacing X, bird B velocity $V_b$, blade tip speed $V_t$, and fan blade stagger angle $A_s$. The preferred embodiment provides that essentially the entire less rugged blade lie in a protected shadow Z of the rugged blade and therefore blade tip speeds are used. Protected shadow Z is an area aft of a line defined by a relative velocity vector $V_r$ which is the resultant of vectors of bird velocity $V_b$ and blade tip speed $V_t$ and has a relative angle $A_r$, with respect to the rotational direction of the blades, that is the angle between vectors $V_r$ and blade tip speed $V_t$. The invention does contemplate, depending on the strength of the less rugged or composite blades, that less rugged blade 20b need not be entirely in protected shadow Z of rugged blade 20a.

FIG. 3 illustrates an alternative embodiment of the present invention wherein the fan stage fan blade assembly includes less rugged blades 20b and rugged blades 20a having the same aspect ratio.

Note, that not all large turbofan engines can make effective use of the present invention and that as a general rule the larger the diameter of the fan, or the length of the fan blades, the faster the blades must turn in order to have an acceptably short axial setback S. The limitation of the application of the present invention is axial setback distance S. Though it may vary from case to case, a practical limit on S is on the order of inches not feet.

TABLE I

| Case | 1 | 2 | 3 | 4 |
|---|---|---|---|---|
| Tip Speed $V_t$ ft/sec | 1500 | 1500 | 1300 | 1300 |
| Bird Velocity $V_b$ ft/sec | 250 | 375 | 250 | 375 |
| Number of Blades | 26 | 26 | 22 | 22 |
| Blade Diameter D (inches) | 93 | 93 | 120 | 120 |
| Blade Spacing X @ Tip (inches) | 11.237 | 11.237 | 17.136 | 17.136 |
| Stagger Angle $A_s$ @ Tip (degrees) | 63.4 | 63.4 | 60 | 60 |
| Relative Angle $A_r$ @ Tip (degrees) | 9.46 | 14.04 | 10.89 | 16.09 |
| Setback Distance S (inches) | 2.805 | 5.611 | 14.837 | 17.109 |

Table I illustrates setback S of four analytical case studies for given engine configuration and bird velocity design points. The first two cases are for a CF6 type engine fan having a 93 inch diameter fan at a design point blade tip speed of 1500 ft/sec having a calculated setback of 2.805 inches and 5.611 inches for design point bird speeds of 250 and 375 ft/sec respectively. These are acceptable setback values.

The second two cases are for an engine fan having a 120 inch diameter fan at a design point blade tip speed of 1300 ft/sec having a calculated setback of 14.837 inches and 17.1092 inches for design point bird speeds of 250 and 375 ft/sec respectively. These are not acceptable setback values due to fan blade frequency, weight, and strength considerations. This does not mean that the invention cannot be used on the larger diameter slower speed fan engine. Rather, it means that less than the entire but still a substantial portion of the less rugged fan blades will be shadowed by the rugged fan blades from FOD. The design and construction of such a fan blade assembly must take this into consideration.

Designers must judiciously choose design points consistent and appropriate for the particular size engine that is being designed and the analysis represented in Table I is for illustrative purposes only.

While the preferred embodiment of our invention has been described fully in order to explain its principles, it is understood that various modifications or alterations may be made to the preferred embodiment without departing from the scope of the invention as set forth in the appended claims.

I claim:

1. A fan blade assembly for a turbofan engine fan stage circumscribed by a fan casing, said fan blade assembly comprising:

a plurality of rugged FOD resistant fan blades circumferentially disposed on a fan rotor in the fan stage and in rotational sealing engagement with the fan casing, a plurality of less rugged fan blades made of a lighter weight material than said rugged blades are circumferentially disposed on said fan rotor in the fan stage and in rotational sealing engagement with the fan casing, and said less rugged blades are staggered with respect to said rugged blades such that leading edges of said rugged blades are axially displaced on said fan rotor forward of the leading edges of said less rugged blades.

2. A fan blade assembly as claimed in claim 1 wherein said less rugged blades are axially displaced on said fan rotor sufficiently aft of adjacent ones of said rugged blades so that essentially each of said plurality of less rugged blades lie entirely in a protected shadow of adjacent ones of said rugged blades wherein said protected shadow is an area aft of a line defined from said rugged blade leading edge by a relative velocity vector $V_r$ which is the resultant of vectors of a bird velocity $V_b$ and a blade tip speed $V_t$.

3. A fan blade assembly as claimed in claim 1 wherein said less rugged blades are axially displaced on said fan rotor sufficiently aft of adjacent ones of said rugged blades so that a portion of each of said plurality of less rugged blades lie in a protected shadow of adjacent ones of said rugged blades wherein said protected shadow is an area aft of a line defined from said rugged blade leading edge by a relative velocity vector $V_r$ which is the resultant of vectors of a bird velocity $V_b$ and a blade tip speed $V_t$.

4. A fan blade assembly for a turbofan engine fan circumscribed by a fan casing, said fan blade assembly comprising:

a plurality of rugged FOD resistant fan blades circumferentially disposed on a fan rotor in the fan stage and in rotational sealing engagement with the fan casing, a plurality of less rugged fan blades made of a lighter weight material than said rugged blades are circumferentially disposed on said fan rotor in the fan stage and in rotational sealing engagement with the fan casing, and said less rugged blades are staggered with respect to said rugged blades such that said leading edges of said rugged blades are axially displaced on said fan rotor forward of the leading edges of said rugged blades, wherein said less rugged blades are equal in number to and evenly disposed between said rugged blades.

5. A fan blade assembly for a turbofan engine fan stage circumscribed by a fan casing, said fan blade assembly comprising:

a plurality of rugged FOD resistant fan blades circumferentially disposed on a fan rotor in the fan stage and in rotational sealing engagement with the fan casing, a plurality of less rugged fan blades made of a lighter weight material than said rugged blades are circumferentially disposed on said fan rotor in the fan stage and in rotational sealing engagement with the fan casing, and said less rugged blades are staggered with respect to said rugged blades such that said leading edges of said rugged blades are axially displaced on said fan rotor forward of the leading edges of said less rugged blades, wherein said less rugged blades are composite blades and said rugged blades are hollow titanium blades.

6. A fan blade assembly for a turbofan engine fan stage circumscribed by a fan casing, and fan blade assembly comprising:

a plurality of rugged FOD resistant fan blades circumferentially disposed on a fan rotor in the fan stage and in rotational sealing engagement with the fan casing, a plurality of less rugged fan blades made of a lighter weight material than said rugged blades are circumferentially disposed on said fan rotor in the fan stage and in rotational sealing engagement with the fan casing, and said less rugged blades are staggered with respect to said rugged blades such that said leading edges of said rugged blades are axially displaced on said fan rotor forward of the leading edges of said less rugged blades, wherein said less rugged blades are axially displaced on said fan rotor sufficiently aft of adjacent ones of said rugged blades so that a portion of each of said plurality of less rugged blades lie in a protected shadow of adjacent ones of said rugged blades wherein said protected shadow is an area aft of a line defined from said rugged blade leading edge by a relative velocity vector $V_r$ which is the resultant of vectors of a bird velocity $V_b$ and a blade tip speed $V_t$, wherein said less rugged blades and said rugged blades have the same aspect ratio.

7. A fan blade assembly for a turbofan engine fan stage circumscribed by a fan casing, said fan blade assembly comprising:

a plurality of rugged FOD resistant fan blades circumferentially disposed on a fan rotor in the fan stage and in rotational sealing engagement with the fan casing, a plurality of less rugged fan blades made of a lighter weight material than said rugged blades are circumferentially disposed on said fan rotor in the fan stage and in rotational sealing engagement with the fan casing, and said less rugged blades are staggered with respect to said rugged blades such that said leading edges of said rugged blades are axially displaced on said fan rotor forward of the leading edges of said less rugged blades, wherein said less rugged blades and said rugged blades are wide chord fan blades.

* * * * *